United States Patent [19]
Fischer

[11] Patent Number: 5,741,100
[45] Date of Patent: Apr. 21, 1998

[54] EXPANSIBLE FIXING MEMBER

[75] Inventor: Artur Fischer, Waldachtal, Germany

[73] Assignee: Fischerwerke, Artur Fischer GmbH & Co. KG, Waldachtal, Germany

[21] Appl. No.: 557,738

[22] Filed: Nov. 13, 1995

[30] Foreign Application Priority Data

Nov. 23, 1994 [DE] Germany ............... 44 41 750.0

[51] Int. Cl.$^6$ ............................................. F16B 13/04
[52] U.S. Cl. ........................ 411/79; 52/698; 52/707; 411/80; 411/903
[58] Field of Search ................ 52/698, 704, 706, 52/707, 708, 709, 711; 411/79, 80, 55, 60, 903

[56] References Cited

U.S. PATENT DOCUMENTS

| | | | |
|---|---|---|---|
| 939,457 | 11/1909 | Vernon et al. | 411/79 X |
| 1,396,398 | 11/1921 | Bowman . | |
| 1,996,121 | 4/1935 | Phillips | 52/698 X |
| 2,878,668 | 3/1959 | Starling et al. | 52/698 X |
| 2,934,990 | 5/1960 | Johnson et al. | 411/79 |
| 3,427,919 | 2/1969 | Lerich . | |
| 4,193,246 | 3/1980 | Schiefer et al. | 52/698 |
| 5,490,365 | 2/1996 | Roth | 52/704 |

FOREIGN PATENT DOCUMENTS

| | | | |
|---|---|---|---|
| 2304816 | 10/1976 | France | 411/80 |
| 2914739 | 10/1980 | Germany . | |
| 3216115 | 11/1983 | Germany . | |
| 2637350 | 12/1983 | Germany . | |
| 605976 | 5/1978 | U.S.S.R. | 411/80 |
| 1755127 | 2/1922 | United Kingdom | 411/79 |
| 1321479 | 6/1973 | United Kingdom | 411/80 |

*Primary Examiner*—Michael Safavi
*Assistant Examiner*—Kevin D. Wilkens
*Attorney, Agent, or Firm*—Michael J. Striker

[57] ABSTRACT

A fixing element has a shank having a rear end and a leading end, a holding element arranged on the rear end of clamping an article to a building component, at least one expansion region extending from the leading end in a longitudinal direction for part of a length of the shank. The expansion region is formed by a longitudinal slot with a base surface raising toward the leading end. A expansion member is inserted in the longitudinal slot. The base surface slopes upwardly and ends at an outer circumference of the shank at a distance from the leading end. The expansion member is formed as a wedge with a length substantially corresponding to a lenght of the longitudinal slot and lies on the base surface so as to be displaceable toward the leading end. The wedge has an outer surface provided with roof-shaped teeth which project beyond the shank at least by a part of a height of the teeth.

13 Claims, 2 Drawing Sheets

EXPANSIBLE FIXING MEMBER

BACKGROUND OF THE INVENTION

The present invention relates generally to a fixing member having holding means arranged at a rear end for clamping an article.

More particularly, it relates to a fixing member which is provided with an expansion member.

Fixing elements of the above mentioned general type are known in the art. One of such fixing elements is disclosed for example in the patent document DE-OS 29 14 739. The fixing element disclosed in this document is provided in the region of its leading end with an expansion region formed by a longitudinal slot with a base surface rising toward the leading end, and an expansion member is inserted in the longitudinal slot. The fixing element is anchored as follows. The shank is driven into a hole pre-drilled in a building component and the article to be fixed is being clamped to the building component. The shank is displaced axially with respect to digging of the expansion member into the wall of the drilled hole. Due to the upwardly sloping base surface of the longitudinal slot which receives the expansion member, the expansion member is pressed radially outwardly and the fixing element is therefore wedged in the drilled hole.

The known fixing element however has a drawback due to the fact that the expansion member has teeth at its outer surface which forms straight edges projecting beyond the shank transversely to the longitudinal direction. When the fixing element is being driven into the building component the edges which take up the entire width of the expansion member present great resistance. Particularly, when the building component consists of concrete, apart from high driving-in resistance which is not conductive to easy mounting, this could also lead to damage to the fixing element which will impair the anchoring function. Furthermore, when the expansion element is being driven in, the material is scraped off the inner wall of the drilled hole. It collects in the longitudinal slot and in certain circumstances leads to jamming of the expansion member in the longitudinal slot. Therefore, the ability of the expansion element to be displaced in the longitudinal slot is impaired to such an extent that subsequent expansion after the anchoring when the drilled hole should enlarge as a result of crack forming, is actually impossible. For this reason the known fixing elements are not suitable for use in the zone which is subject to tensile forces in which cracks occur.

Also, the known fixing elements are not suitable for use in the zones subject to tensile forces and have relatively low holding values even in uncracked concrete since the longitudinal slot is bounded toward the leading end of the fixing element by a stop face. As a result, only small angle of rise of the base surface of the longitudinal slot can be achieved, and on the other hand the length of the expansion member compared with the length of the longitudinal slot also has to be considerably reduced in order to achieve an adequate displacement path for anchoring. When, in addition, the drilled hole should enlarge as a result of crack forming, there is the danger that the expansion member will bear against the front stop face of the longitudinal slot and provide no further opportunity for expansion. This situation can occur for example even when the hole to be pre-drilled for the fixing member turns out to be somewhat larger than it is made.

SUMMARY OF THE INVENTION

Accordingly, it is an object of the present invention to provide a fixing element of the above mentioned general type, which avoids the disadvantages of the prior art.

In keeping with these objects and with others which will become apparent hereinafter, one feature of the present invention resides, briefly stated, in a fixing element in which the upwardly sloping base surface of the longitudinal slot ends at the outer circumference of the shank at a spacing from the leading end, and the expansion member is formed as a wedge with a length approximately corresponding to the length of the longitudinal slot and lies on the base surface so as to be displaceable toward the leading end, while the outer surface of the wedge is provided with roof-shaped teeth projecting beyond the shank at least by part of their height.

When the fixing element is designed in accordance with the present invention, it can be driven with little resistance and in a simple manner into a building component, and as a result of its advantageous subsequent expansion behavior has high holding values even when the drilled hole enlarges due to crack forming.

When the wedge is inserted in the longitudinal slot in the shank of the fixing element, and its outer surface is provided with roof-shaped teeth which project beyond the shank by part of their height, then as the fixing element is being driven into the prepared drilled hole only a groove is scored out. Since only the apex of the toothed wedge digs into the wall of the drilled hole, there is only slight resistance to be overcome as the fixing element is driven in. When a nut is screwed on in order to anchor the fixing element the fixing element is prevented from rotating by the teeth digging in. Since the roof-shaped teeth dig into the wall of the drilled hole, the wedge is held immovably and the shank is displaced axially with respect to the wedge. The upwardly sloping base surface of the longitudinal slot presses the wedge radially outwardly into the wall of the drilled hole, and the roof-shape of the teeth reduces the resistance of the upper surface of the wedge to penetrating into the wall of the drilled hole. For anchoring, also only a slight turning torque is required. Moreover, since the upwardly sloping base surface of the longitudinal slot ends at the outer circumference of the shank at a spacing from the leading end, a longer expansion member with larger pressure-applying area can be used, and furthermore, a large radial expansion can be achieved because of the steeper angle of rise of the base surface combined with smaller axial displacements. When the drilled hole is enlarged, the wedge can be displaced if desired, so that a part of its length lies beyond the longitudinal slot, and the full length of the shank can be used for the anchoring.

In accordance with a further feature of the present invention, the longitudinal slot has at its end facing toward the rear end of the fixing element at least a depth corresponding to half the diameter of the shank, and the angle of rise of the base surface lies between 10° and 15°, preferably between 11° and 13°. This construction has proved especially advantageous for the holding value of the fixing element and its subsequent expansion behavior.

Still another feature of the present invention is that the fixing element is designed so that a sliding-contact layer is provided between the bearing face of the wedge and the base surface of the longitudinal slot. This ensures that the wedge is readily displaceable even under extreme conditions. The sliding-contact layer can be composed of a plastic material or formed by corresponding surface treatment of the base surface of the longitudinal slot and/or the bearing face of the wedge.

The height of the teeth arranged on the outer surface of the wedge can decrease slightly toward the leading end. When the fixing element is designed with this feature, a further reduction in the resistance to driving in is achieved.

A semi-circular stop member can be provided at the boundary of the longitudinal slot nearest to the rear end of the fixing element, so that the wedge can bear at its deepest position against the stop member. In this construction the wedge is supported as the fixing element is being driven in.

In accordance with a further feature of the present invention, a retaining element formed for example as a rubber ring, stamped bead, or the like, can hold the wedge movably in the longitudinal slot before the fixing element is driven into the drilled hole. Therefore, the wedge does not accidentally fall out of the longitudinal slot. The teeth can be provided with disparate tooth flanks with the shorter tooth flank arranged toward the leading end. This provides for a good locking action of the teeth combined with a lower resistance to driving in.

Still another feature of the present invention is that a scraper edge is provided in the fixing element and formed by a projection at the leading end. The scraper element scrapes off the drilling dust and pushes it toward the bottom of the drilled hole. Therefore, the possibility of impairing the displaceability of the wedge by drilling dust clinging to the wall of the drilled hole and getting into the longitudinal slot as the fixing element is driven in is eliminated.

In accordance with a further embodiment of the present invention, a ramp extends to the tip of the first tooth at the leading end of the wedge. First of all, this facilitates driving in and secondly distributes the pressure force on the base surface of the longitudinal slot, in particular in the leading thinner region of the wedge, more uniformly. Therefore indentations in the base surface caused by stress peaks encouraging the tendency of the wedge to bind on the base surface during displacement of the wedge because of a tensile stress are avoided.

It is especially advantageous when the length of the ramp corresponds at least to the length of two teeth, an the angle of the ramp corresponds approximately to the angle of rise of the base surface of the longitudinal slot.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
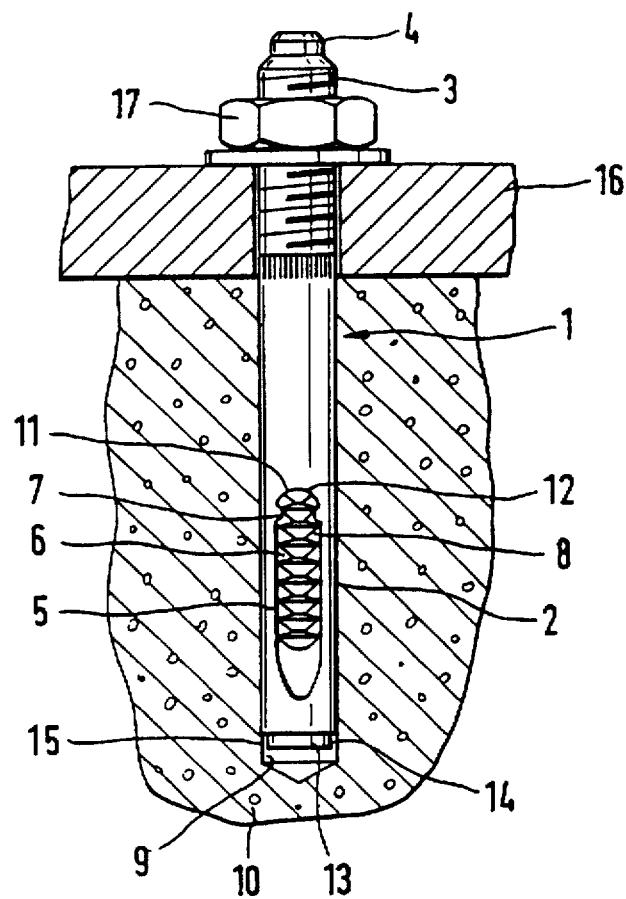
FIG. 1 is a view showing a fixing element in accordance with the present invention, inserted in a hole drilled in a building component and having a wedge lying in a longitudinal slot of its expansion zone.

A fixing element in accordance with the present invention is shown in FIG. 1 and identified as a whole with reference numeral 1. It has a shank 2 provided with an external thread 3 at its rear end 4. It also has an expansion zone formed by a longitudinal slot 5 of U-shaped cross-section, and a wedge 6 inserted in the longitudinal slot. The wedge 6 is readily displaceable in the longitudinal slot 5. It is held by a retaining element 7 which is formed in this particular embodiment as a stamped bead.

The wedge 6 is provided on its outer surface with teeth 8. The teeth have roof-shaped cross-section as can be seen from FIG. 3. When the fixing element 1 is driven into the drilled hole 9 in a building component 10, the wedge 6 is located in its lowest position. In this position a rear, semi-circular end face 11 of the wedge 6 bears against a boundary of the longitudinal slot 5 which serves as the stop member 12 and also has a semi-circular shape. In this position the teeth 8 project by part of their height beyond the shank 2 of the fixing element.

A leading end 13 of the fixing element 1 is provided with a step 14 of reduced diameter so as to form a scraper edge 15. This provides scraping of drilling dust from the wall of the drilled hole when the fixing element 1 is being driven into the drilled hole 9. The fixing element is driven right through an article 16 to be fixed into the drilled hole. When a nut 17 is screwed onto the projecting threaded portion 3, the shank 2 is displaced with respect to the wedge 6 axially toward the mouth of the drilled hole. Therefore the wedge 6 is pressed radially outwardly by an upwardly sloping base surface 18 of the longitudinal slot 5 as can be seen from FIG. 2. As a result, the teeth 8 of the wedge 6 dig into the wall of the drilled hole and cause the fixing element to be anchored. The teeth 8 have a saw-toothed or trapezoidal profile with a tooth flank 19 sloped toward the leading end 13 to reduce driving-in resistance.

A sliding-contact layer 20 is arranged between the wedge 6 and the base surface 18 of the longitudinal slot 5. The layer can be formed as a plastic material insert, coating or a similar structure. It provides for favorable sliding behavior even under extreme conditions. Such favorable sliding behavior can be also achieved by a suitable surface treatment of a bearing face of the wedge 6 and/or of the base surface 18 of the longitudinal slot 5.

Figure 2:
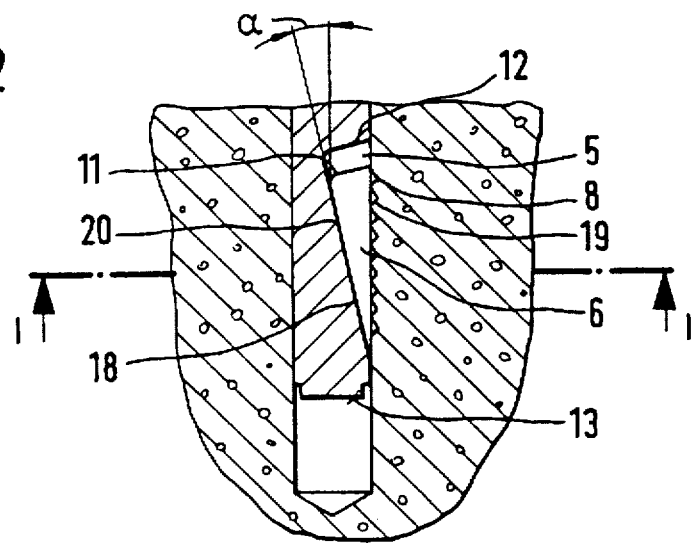
FIG. 2 is a view showing a partial longitudinal section of the fixing element in FIG. 1 in its anchored position.
Figure 3:
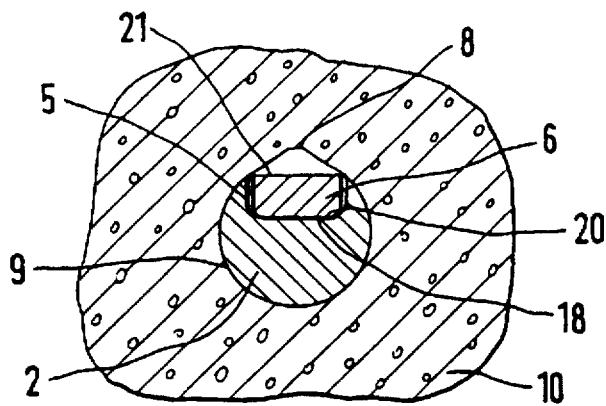
FIG. 3 is a view showing a cross-section of the fixing element in FIG. 2 taken along the line A—A.

FIG. 3 shows a cross-section of FIG. 2 taken along the line A—A. It can be seen that the roof-shaped construction of the tooth 8 encourages the wedge 6 to penetrate deeply into the wall of the hole drilled in the building component 10. In the region of a foot 21 of the tooth, the full width of the wedge 6 is then effected. Therefore, with a relatively low torque for axial displacement, high holding values can be achieved with the fixing element formed in accordance with the present invention.

Figure 4:
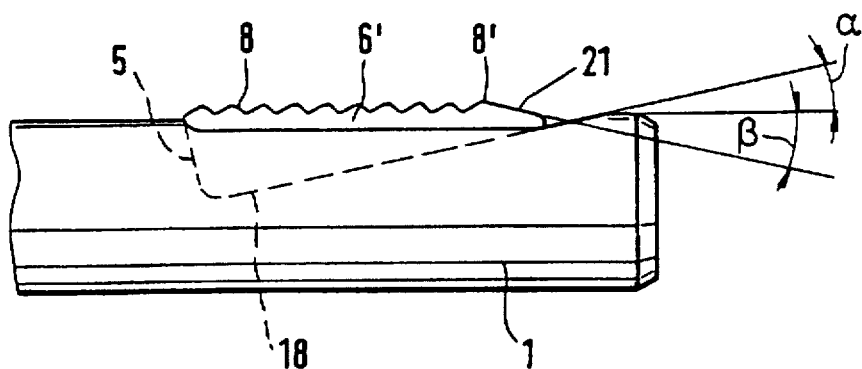
FIG. 4 is a side view of the fixing element in accordance with the present invention, provided with a wedge having a ramp.
Figure 5:
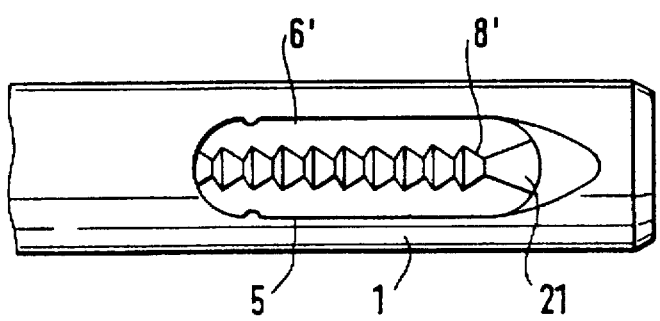
FIG. 5 is a plan view of the wedge of the inventive fixing element according to FIG. 4.

In accordance with another embodiment of the fixing element 1 shown in FIGS. 4 and 5, the wedge 6' inserted in the longitudinal slot 5 has a ramp 21. The ramp extends from the leading end of the wedge 6' as far as the tip of the tooth 8'. The length of the ramp 21 corresponds approximately to the length of two teeth 8. Moreover, the angle β of the ramp 21 can correspond approximately to the angle of rise α of the base surface 18 of the longitudinal slot 5.

It will be understood that each of the elements described above, or two or more together, may also find a useful application in other types of constructions differing from the types described above.

While the invention has been illustrated and described as embodied in an expansible fixing member, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A fixing element, comprising a shank having a rear end and a leading end; holding means arranged on said rear end for clamping an article to a building component; at least one expansion region extending from said leading end in a longitudinal direction for part of a length of said shank, said expansion region being formed by a longitudinal slot with a base surface raising toward said leading end; an expansion member inserted in said longitudinal slot, said base surface sloping upwardly and ending at an outer circumference of said shank at a distance from said leading end, said expansion member being formed as a wedge with a length substantially corresponding to a length of said longitudinal slot and lying on said base surface so as to be displaceable toward said leading end, said wedge having an outer surface provided with trapezoidal teeth which project beyond said shank at least by a part of a height of said teeth.

2. A fixing element as defined in claim 1, wherein said longitudinal slot has an end facing toward said rear end of said fixing element and is provided at said end with at least a depth corresponding to half a diameter of said shank, said base surface having an angle of rise between 10° and 15°.

3. A fixing element as defined in claim 2, wherein said base surface has an angle of rise between 11° and 13°.

4. A fixing element as defined in claim 1; and further comprising a sliding-contact layer arranged so that said wedge in said longitudinal slot rests on said sliding-contact layer.

5. A fixing element as defined in claim 4, wherein said sliding-contact layer is formed by a platelet composed of plastic material and corresponding to said base surface of said longitudinal slot.

6. A fixing element as defined in claim 1; and further comprising a ramp extending to a tip of a first one of said teeth and arranged at a leading end of said wedge.

7. A fixing element as defined in claim 6, wherein said ramp has a length corresponding at least to a length of two of said teeth.

8. A fixing element as defined in claim 6, wherein said ramp has an angle which substantially corresponds to an angle of rise of said base surface of said longitudinal slot.

9. A fixing element as defined in claim 1; and further comprising a semi-circular stop member provided at a boundary of said longitudinal slot nearest to said rear end of said shank, said wedge bearing against said semicircular top member.

10. A fixing element as defined in claim 1; and further comprising a retaining element which holds said wedge.

11. A fixing element, comprising a shank having a rear end and a leading end; holding means arranged on said rear end for clamping an article to a building component; at least one expansion region extending from said leading end in a longitudinal direction for part of a length of said shank, said expansion region being formed by a longitudinal slot with a base surface raising toward said leading end; an expansion member inserted in said longitudinal slot, said base surface sloping upwardly and ending at an outer circumference of said shank at a distance from said leading end, said expansion member being formed as a wedge with a length substantially corresponding to a length of said longitudinal slot and lying on said base surface so as to be displaceable toward said leading end, said wedge having an outer surface provided with trapezoidal teeth which project beyond said shank at least by a part of a height of said teeth, said teeth having a height which decreases relative to a longitudinal central axis of said shank slightly only toward said leading end of said shank when said wedge lies on said base surface of said longitudinal slot.

12. A fixing element, comprising a shank having a rear end and a leading end; holding means arranged on said rear end for clamping an article to a building component; at least one expansion region extending from said leading end in a longitudinal direction for part of a length of said shank, said expansion region being formed by a longitudinal slot with a base surface raising toward said leading end; an expansion member inserted in said longitudinal slot, said base surface sloping upwardly and ending at an outer circumference of said shank at a distance from said leading end, said expansion member being formed as a wedge with a length substantially corresponding to a length of said longitudinal slot and lying on said base surface so as to be displaceable toward said leading end, said wedge having an outer surface provided with trapezoidal teeth which project beyond said shank at least by a part of a height of said teeth, said teeth having disparate tooth flanks including a tooth flank arranged toward said leading end which is shorter than subsequent tooth flanks.

13. A fixing element, comprising a shank having a rear end and a leading end; holding means arranged on said rear end for clamping an article to a building component; at least one expansion region extending from said leading end in a longitudinal direction for part of a length of said shank, said expansion region being formed by a longitudinal slot with a base surface raising toward said leading end; an expansion member inserted in said longitudinal slot, said base surface sloping upwardly and ending at an outer circumference of said shank at a distance from said leading end, said expansion member being formed as a wedge with a length substantially corresponding to a length of said longitudinal slot and lying on said base surface so as to be displaceable toward said leading end, said wedge having an outer surface provided with trapezoidal teeth which project beyond said shank at least by a part of a height of said teeth; and a scraper edge formed by a step and provided at the leading end of said shank.

* * * * *